United States Patent [19]

Kon

[11] Patent Number: 4,681,998
[45] Date of Patent: Jul. 21, 1987

[54] METHOD OF STUD WELDING AND WELDING GUN USED THEREFOR

[75] Inventor: Toshiharu Kon, Yokohama, Japan

[73] Assignees: Nikkai Kensetsu Kabushiki Kaisha, Yokohama; O.S.E. Kabushiki Kaisha, Tokyo, both of Japan

[21] Appl. No.: 759,347

[22] Filed: Jul. 26, 1985

[51] Int. Cl.[4] .................................................. B23K 9/20
[52] U.S. Cl. ......................................... 219/99; 219/72
[58] Field of Search ............................... 219/98, 99, 72

[56] References Cited

U.S. PATENT DOCUMENTS 2,474,531 6/1949 Keir et al. ........................ 219/99 X

FOREIGN PATENT DOCUMENTS

| 2731130 | 1/1979 | Fed. Rep. of Germany ........ 219/98 |
| 146 | 1/1982 | Japan . |
| 5074 | 2/1984 | Japan . |
| 99487 | 6/1985 | Japan . |
| 102280 | 6/1985 | Japan . |
| 2042391 | 3/1980 | United Kingdom .................. 219/98 |
| 2102322 | 2/1983 | United Kingdom .................. 219/98 |

Primary Examiner—Clifford C. Shaw
Assistant Examiner—C. M. Sigda
Attorney, Agent, or Firm—Finnegan, Henderson, Farabow, Garrett & Dunner

[57] ABSTRACT

A method of welding studs inclusive of a bolt or the like to an underwater structure or a land structure in the rain or for mounting anticorrosive members, wherein the tip of the stud held by the welding gun is enclosed by a resilient, heat-resisting water sealing member and a gas generating agent is applied to the tip of the stud. The water sealing member is brought in contact with a base metal and an arc is generated by a current across the stud and the base metal so that the arc heat causes gas to be generated from the gas generating agent to force any water around the stud tip out of the water sealing member under a gas pressure, and then the stud is welded to the base metal in the absence of water.

5 Claims, 5 Drawing Figures

METHOD OF STUD WELDING AND WELDING GUN USED THEREFOR

BACKGROUND OF THE INVENTION

For welding the studs to an underwater structure or to a land structure in the rain, the portable compact stud welding gun commonly used is enclosed by a waterproof case into which air is blown from the exterior to block water flow into the weld zone for effective stud welding.

However, such method of the prior art has encountered various disadvantages such that the operator makes mistakes in the operation, the welding gun becomes disabled or the operator is exposed to a dangerous electric leak due to flooding occurring when the stud welding gun is directed upwards. To overcome such inconveniences, it has already been proposed that, with the welding gun of such type, an outer cylinder is watertightly mounted on the tip of the stud welding gun so as to enclose the stud, then a ferrule and a ferrule retainer are mounted on the open end of said outer cylinder, and a pressurized gas is supplied from the exterior into said outer cylinder so that the gas blows out through a gap between the stud and the ferrule to expel a quantity of water present immediately below the stud through the open end of the outer cylinder and a sponge mass to the exterior in the form of bubbles. Such an underwater stud welding gun is disclosed by Japanese Patent Publication No. 57-146. The underwater stud welding gun disclosed in this Patent Publication is advantageous so far as the quantity of water around a weld zone is expelled by the pressurized gas supplied from the exterior so as to make the weld zone substantially dry, thereby a possible flood is avoided even when the welding gun is directed upwards and the possibility of a flood due to an incorrect manipulation by the operator is also reduced. However, this welding gun requires, in addition to electric wires for welding, control and grounding, an air hose. Thus the operating freedom of the gun is inconveniently reduced. Additionally, the exterior equipment is necessarily of a large size, since a source of a pressurized gas is required.

Furthermore, fine bubbles discharged through the sponge mass enclosing the open end of the outer cylinder to the exterior during operation makes it difficult to observe the situation at the weld zone and the concentric arrangement of the ferrule, the ferrule retainer, the outer cylinder and the sponge mass, in this order, around the stud necessarily makes the gun tip of a relatively large diameter, so that it is impossible to perform the stud welding at intervals less than the radius of such gun tip.

Moreover, when air is used as the gas, the oxygen partial pressure increases as the depth of water increases so that a suitable inert gas must be used, in the place of the air. Such inert gas must be continuously supplied under pressure to the stud welding gun so long as the latter is present in water and this adds to the cost of the welding operation considering the high consumption of the inert gas.

SUMMARY OF THE INVENTION

A principal object of the present invention is to eliminate the inconveniences occuring from having to provide an external air hose of the same length as that of each electric wire are connected to the stud welding gun by providing a method for welding where the quantity of water around the weld zone is expelled out without any pressurized gas supplied from the exterior to perform the desired welding operation.

DETAILED DESCRIPTION OF PREFERRED EMBODIMENTS

Figure 1:
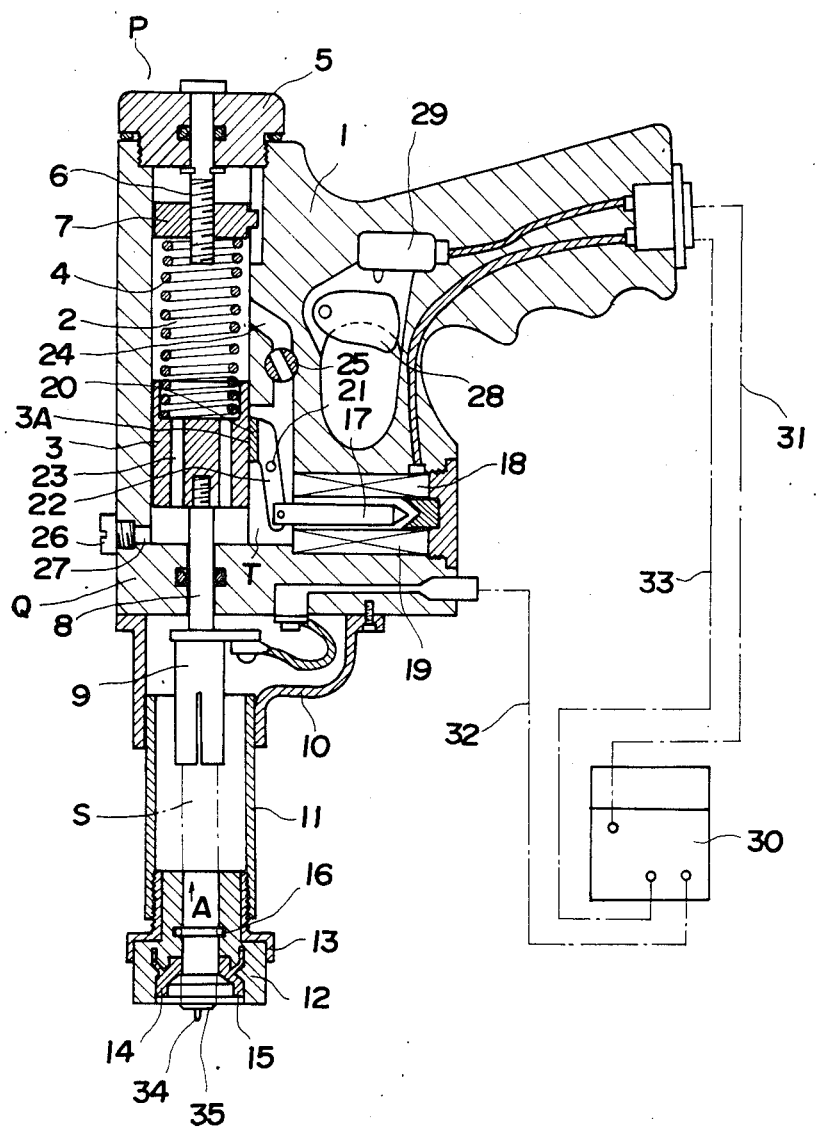
FIG. 1 is a longitudinal section of a welding gun used in welding method according to the present invention.

Details of the welding gun according to the present invention will be described first in reference with FIG. 1.

Reference numeral 1 designates a gun body including a cylinder chamber 2 extending from a rear end surface P to a forward end Q thereof and said cylinder chamber 2 contains therein a piston 3 and a coil-like return spring 4 for a stud. Reference numeral 5 designates a cap liquid-tightly threaded into an open end of the cylinder chamber 2. Reference numeral 6 designates an adjusting threaded spindle liquid-tightly extending through said cap 5 and a spring bearing 7 is threaded on said threaded spindle 6. Said stud return spring 4 is carried between said spring bearing 7 and the piston 3. Reference numeral 8 designates a piston rod fixedly mounted in the piston 3 and that liquid-tightly extends through the tip of the gun body 1. A chuck 9 is mounted on a front end of said piston rod 8 projecting forwards from said gun tip.

A cover 10 and a cylindrical member 11 made of transparent insulating material are mounted, in this order, on the front end of the gun body 1. An annular, cup-shaped liquid sealing member 12 made of heat-resisting resilient material such as heat-resisting rubber is liquid-tightly threaded on the front end of said cylindrical member 11 by means of a mounting cover 13. Reference numeral 15 designates an arc shield member securely fitted into a recess 14 centrally formed in the front end of said liquid sealing member 12. A stud S is loosely inserted in a direction as indicated by an arrow A into the arc shield member 15, then liquid-tightly extending through a packing member 16 such as an O-ring arranged in the liquid sealing member 12 and being held by said chuck 9.

A movable core member 17 and a solenoid coil 18 enclosing this are accommodated within a solenoid chamber 19, transverse of the longitudinal direction of said cylinder chamber 2, piston rod 8 and stud S, and said solenoid chamber 19 communicates with said cylinder chamber 2.

Reference numeral 20 designates a slider member mounted on one end of a link 22 in slidable contact with outer periphery 3A of the piston 3. Said link 22 is pivotally supported at one end by a pin 21 on the gun body 1 and connected at the other end to said movable core member 17.

Said piston 3 has one or more communicating bores 23. A communicating channel 24 is formed in the gun body 1 to communicate a portion of the cylinder chamber 2 in front of the piston 3 with another portion of said cylinder chamber 2 defined behind said piston 3, and said communicating channel 24 contains therein a regulator valve 25 adapted to be manually operated from the exterior.

Said cylinder chamber 2, said solenoid chamber 19, said communicating channel 24 and space T within the gun body 1 so defined to communicate with above-mentioned components are filled with insulating liquid of anticorrosive property, for example, oil injected through an inlet 27 formed in the gun body 1 and normally closed by a plug 26 threaded thereinto. Reference numeral 28 designates a trigger mounted on the gun body 1, 29 a starting switch, 30 a welding equipment on the land inclusive of a power supply and a control unit, 31 electric wire for control, 32, 33 electric wires for welding, 34 and electrode projecting from a tip 35 of the stud S, W base metal such as iron plate or stainless plate, and G a gas generating agent affixed to the tip 35 of the stud S, the latter being an essential feature of the present invention.

The welding method according to the present invention is characterized in that a gas generating agent G is affixed to the weld zone enclosed by the liquid sealing member 12, said gas generating agent G being thermally decomposed by an arc heat to cause gas generation so that any water is expelled by the pressure of the gas generated from around the tip 35 of the stud S and out of the liquid sealing member 12 and thereby the desired welding operation is achieved in an atmosphere substantially free from water.

This gas generating agent G is prepared by mixing a substance tending to generate an inert gas such as carbon dioxide gas at a relatively low temperature, for example, sodium bicarbonate (NaHCO$_3$) with powdery alluminium (Al) at a predetermined ratio using an epoxy resin as a binder or by coating sodium bicarbonate with a water-proof membrane, and affixing it to said tip 35 of the stud S in such a water-insoluble condition.

The reaction of thermal decomposition according to which the gas generating agent generates gas can be expressed by:

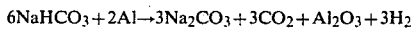

$$6NaHCO_3 + 2Al \rightarrow 3Na_2CO_3 + 3CO_2 + Al_2O_3 + 3H_2$$

The carbon dioxide gas CO$_2$ functions as an inert gas and coacts with hydrogen H$_2$ simultaneously generated to increase the gas pressure for optimal welding operation.

Thermal decomposition of approximately 400 mg of sodium bicarbonate produces approximately 6 l/min enough to shield the weld zone for the stud. The gas generating agent G is not limited to sodium bicarbonate and may be any other compounds so long as these compounds can generate inert gas on the order of 5 to 8 l/min.

Now the manner in which the desired welding is carried out using the welding gun according to the present invention will be described.

Figure 2:
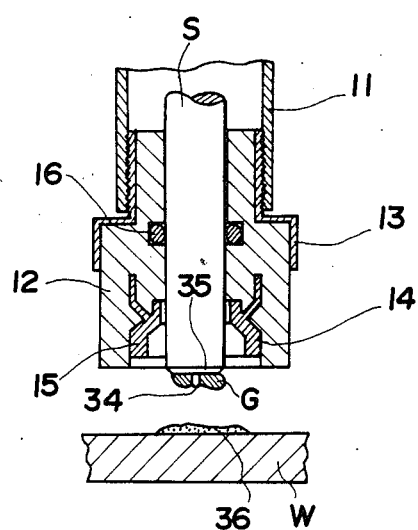
FIGS. 2 through 5 are longitudinal sections of the tip of the gun sequentially showing the steps of the welding method according to the present invention.
Figure 3:
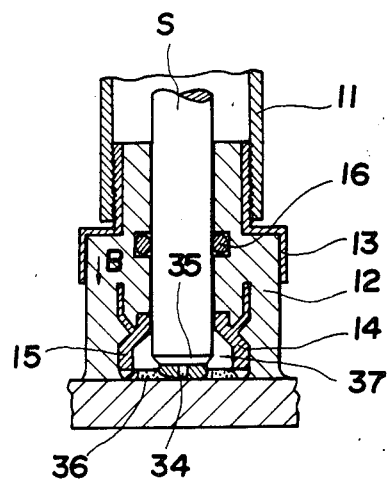

As seen in FIG. 2, a gas generating agent G is previously affixed to the tip 35 of the stud S held by the chuck and projecting from the arc shield member 15. On the other hand, flux 36 which is not decomposed or molten in water, for example, in the form of colloid, is applied on the base metal W at locations destined to be welded for a reliable of welding effect (FIG. 2). Then, the stud S is held with the gun body 1 against the base metal W perpendicularly thereto so that said stud S is urged in a direction as indicated by the arrow A (FIG. 1) while the piston 3 is retracted in the same direction and the liquid sealing member 12 is compressed in a direction as indicated by an arrow B (FIG. 3). Thus, said liquid sealing member 12 is pressed closely against the surface of the base metal W, forming a small sealed space 37 defined by the arc shield member 15, the stud S and the base metal W (FIG. 3).

When the trigger 28 provided on the gun body 1 is squeezed to actuate the starting switch 29 for the liquid-tight structure, the external welding equipment 30 including the power supply and the control unit is actuated through the electric wire 31 for control. With consequence, the solenoid coil 18 is energized to attract the movable core member 17 and the slider member 20 is pressed against the outer periphery 3A of the piston 3, fixing said piston 3. On the other hand, a weak welding current may be applied by the electric wires 32, 33 for welding across the base metal W and the stud S and, at the same time, the stud S may be slightly spaced from the base metal W to generate a pilot arc.

Figure 4:
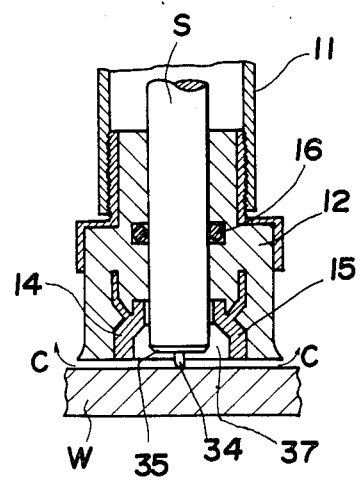

Upon formation of this pilot arc, the heat therefrom causes the thermal decomposition of the gas generating agent G, explosively generating, for example, carbon dioxide gas along with hydrogen, the pressure of which expels any water present in the sealed space 37 through the gap between the liquid sealing member 12 and the base metal W in a direction as indicated by an arrow C (FIG. 4).

Figure 5:
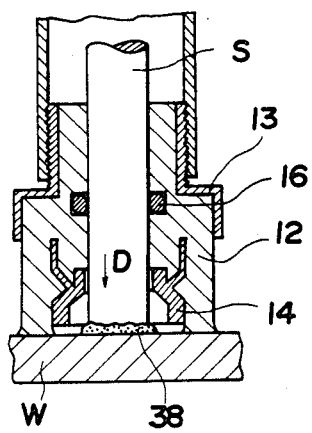

Then the arc discharge heat melts the tip 35 of the stud S and the surface of the base metal, forming a mass of molten metal 38 (FIG. 5). It will be readily apparent that the arc discharge heat, the heat of said molten metal etc. increase the pressure within the sealed space 37 and prevent any noticeable quantity of water from flowing thereinto.

After a predetermined period has elapsed, the welding gun is deenergized to demagnetize the solenoid coil 18 so that the piston 3 is now released from the slider member 20 and moves forward under the resilient force of the stud return spring 4 in a direction as indicated by an arrow D so that the stud S is forced against the base metal W where the desired welding is achieved by the molten metal 38 (FIG. 5).

The quantity of liquid filling the cylinder chamber 2 moves between sections of said cylinder chamber 2 defined in front of and behind it, respectively, through the communicating bores 23 and the communicating channel 24 as the piston 3 moves back and forth. A rate at which the stud S is delivered forward by the stud return spring 4 is adjustable by regulating the opening of the regulator valve 25.

It should be noted here that the gas generating agent G may be affixed not only to the tip 35 of the stud S but also to the surface of the base metal and, particularly when a substance of a relatively low decomposition temperature is used, said gas generating agent G may be affixed also to the arc shield member 15 or the liquid sealing member 12. Furthermore, the present invention is applicable also to a stud welding method in which the arc is produced with the sud S not being initially spaced from the base metal W as described but being set at the position as shown in FIG. 3.

According to the present invention, the sealed space 37 is formed when the tip 35 of the stud S enclosed by the liquid sealing member 12 is pressed against the base metal W in liquid (water), the gas generating agent G previously affixed to the stud is thermally decomposed by the arc discharge heat primarily for the welding to generate gas by which liquid (water) present within the sealed space 37 is forcibly removed for reliably welding the stud S to the base metal W. This means that an air hose as has usually been necessary in the prior art is no longer necessary and the freedom of operation is correspondingly improved. No gas is discharged to the exterior until the stud S is set to the predetermined location and applied with welding current, so that the field of vision is not obstructed by bubbles and a reliable welding can be achieved after the stud S has been exactly positioned on the location to be welded. The liquid sealing member 12 is heat-resisting and resilient, so this member 12 well resists the welding heat and not only can be brought closely against the surface of the base metal W but also formation of the gap through which water removal is effected under the gas pressure is thereby facilitated so that a reliable welding can be achieved substantially in the absence of water.

Furthermore, generation of inert gas according to the present invention allows stable formation of an arc even in deep water and, therefore, a reliable welding.

Moreover, the sealed space 37 formed by the liquid sealing member 12 enclosing the tip 35 of the stud S may be relatively small, with consequence, that the welding gun may be of a relatively small diameter and making it possible to make welds at narrow intervals.

The gun body 1 containing therein the parts for positioning and driving required for the stud welding is filled with anti-corrosive and insulating liquid such as oil which serves to prevent ambient water from flowing into it. So long as the gun body is filled with pressurized liquid, occurrence of electric leak, corrosion, electrolytic corrosion etc. can be effectively avoided during use even in deep water and safety can be assured without provision of any particular pressure-resisting structure.

I claim:

1. A method of welding a metal stud having an electrode on its forward tip to a base material in an underwater environment comprising surrounding the tip of the stud in an annular, cup-shaped heat-resisting and resilient liquid sealing member that is open towards the base material, affixing a thermally decomposable gas generating agent to the tip of the stud, bringing the open side of the liquid sealing member tightly into contact with the base material to provide a sealed space for the tip of the stud, supplying electric current across the electrode of the stud and the base material to produce an arc and generate heat thereby causing the electrode to become molten and the gas generating agent to decompose and generate gas at a sufficently high enough pressure to instantaneously expel out of the liquid-sealing member any water present around the tip of the stud thereby establishing a water free atmosphere for the welding operation.

2. The method of claim 1, wherein the gas generating agent generates carbon dioxide.

3. The method of claim 2, wherein the gas generating agent contains a mixture of sodium bicarbonate, aluminum powder and a binder.

4. The method of claim 3, wherein the binder is an epoxy resin.

5. The method of claim 2, wherein the gas generating agent is sodium bicarbonate enclosed in a water-proof membrane.

* * * * *